United States Patent
Bentley et al.

(10) Patent No.: US 9,014,666 B2
(45) Date of Patent: Apr. 21, 2015

(54) AUTHENTICATION BASED ON GEO-LOCATION HISTORY

(75) Inventors: Jon Louis Bentley, New Providence, NJ (US); George William Erhart, Loveland, CO (US); Lawrence O'Gorman, Madison, NJ (US); Michael J. Sammon, Watchung, NJ (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 2622 days.

(21) Appl. No.: 11/611,720

(22) Filed: Dec. 15, 2006

(65) Prior Publication Data
US 2008/0146193 A1    Jun. 19, 2008

(51) Int. Cl.
    H04W 12/06    (2009.01)
    H04W 4/02     (2009.01)
    H04L 29/06    (2006.01)
    G06F 21/34    (2013.01)
    H04W 88/02    (2009.01)

(52) U.S. Cl.
    CPC ............ H04L 63/0853 (2013.01); G06F 21/34 (2013.01); H04L 63/107 (2013.01); H04W 12/06 (2013.01); H04W 88/02 (2013.01)

(58) Field of Classification Search
    CPC .............................. H04W 12/12; H04W 64/00
    See application file for complete search history.

(56) References Cited

U.S. PATENT DOCUMENTS

| | | | |
|---|---|---|---|
| 5,757,916 A * | 5/1998 | MacDoran et al. | 380/258 |
| 6,073,062 A * | 6/2000 | Hoshino et al. | 701/3 |
| 7,082,297 B2 | 7/2006 | Tuomi et al. | |
| 7,099,676 B2 * | 8/2006 | Law et al. | 455/456.6 |
| 7,123,604 B2 | 10/2006 | Inoue et al. | |
| 7,136,646 B1 | 11/2006 | Back et al. | |
| 7,372,839 B2 * | 5/2008 | Relan et al. | 370/338 |
| 7,397,365 B2 * | 7/2008 | Wang | 340/539.13 |
| 2002/0068580 A1 * | 6/2002 | Bala et al. | 455/456 |
| 2002/0076015 A1 * | 6/2002 | Norwitz et al. | 379/93.09 |
| 2003/0236614 A1 * | 12/2003 | Yamakita et al. | 701/207 |
| 2005/0071671 A1 * | 3/2005 | Karaoguz | 713/200 |
| 2006/0020816 A1 * | 1/2006 | Campbell | 713/182 |
| 2006/0173776 A1 | 8/2006 | Shalley et al. | |
| 2007/0053306 A1 * | 3/2007 | Stevens | 370/252 |
| 2007/0197197 A1 * | 8/2007 | Minear | 455/414.1 |
| 2007/0208503 A1 * | 9/2007 | Harnsberger | 701/208 |
| 2007/0234408 A1 * | 10/2007 | Burch et al. | 726/6 |

OTHER PUBLICATIONS

Seema Sharma, Location Based Authentication, May 20, 2005, University of New Orleans ScholarWorks@UNO, pp. 1-58.*

* cited by examiner

*Primary Examiner* — Vladimir Magloire
*Assistant Examiner* — Frank Donado

(57) ABSTRACT

Methods and apparatus are disclosed for authenticating a user based on the geo-location history of a geo-location-enabled wireless device (e.g., a GPS-enabled wireless telecommunications terminal, a smart card, an RFID tag, etc.). In a first illustrative embodiment, a user of a geo-location-enabled wireless telecommunications terminal (e.g., a GPS-enabled cell phone, a GPS-enabled notebook computer, etc.) who attempts to access a restricted resource is challenged with one or more questions that are generated from the terminal's geo-location history. In a second illustrative embodiment, a user of a data-processing system who attempts to access a restricted resource is asked to provide a username Z. The user is then challenged with one or more questions that are generated from the geo-location history of a wireless device that is associated with username Z (e.g., a cell phone that belongs to the user whose username is Z, etc.).

15 Claims, 11 Drawing Sheets

Figure 3

| Terminal ID | Time | Latitude | Longitude ⟵ 201 |
|---|---|---|---|
| 555-123-4567 | 08-12-2006 15:35:28 EST | 40.47 N | 73.58 W |
| ... | ... | ... | ... |

| Locale ID | Locale Name | Terminal ID | Latitude | Longitude |
|---|---|---|---|---|
| LX24397R | Home | 555-123-4567 | 40.40 N | 72.42 W |
| LY62411A | Work | 555-123-4567 | 40.47 N | 73.58 W |
| JT08328D | Yankee Stadium | *null* | 40.47 N | 73.58 W |
| | ... | ... | ... | ... |

| Event ID | Terminal ID | Start Time | Start Locale | End Time | End Locale | Route | Avg Speed | Max Speed |
|---|---|---|---|---|---|---|---|---|
| 91A47G208W3 | 555-123-4567 | 08-12-06 18:44:31 | LX24397R | 08-13-06 07:42:57 | LX24397R | *null* | 0 | 0 |
| 91A47G208W3 | 555-123-4567 | 08-13-06 07:42:58 | LX24397R | 08-13-06 08:20:05 | LY62411A | GSP N | 55 | 71 |
| ... | ... | ... | ... | ... | ... | ... | ... | ... |

Figure 5

AUTHENTICATION BASED ON GEO-LOCATION HISTORY

FIELD OF THE INVENTION

The present invention relates to computer security in general, and, more particularly, to authentication based on geo-location history.

BACKGROUND OF THE INVENTION

In many instances it is desirable for security reasons to require that a user be authenticated before he or she is allowed to access a resource (e.g., file, application, etc.) of a data-processing system (e.g., a desktop personal computer, a server, a personal digital assistant [PDA], a smartphone, etc). Typically a user is presented with an authentication challenge, and the user must supply a valid response to the challenge. A ubiquitous challenge/response mechanism, colloquially referred to as "logging in," is to prompt a user for his or her username and password. A disadvantage of this technique, however, is that users often select passwords that can be easily guessed. In addition, passwords can be stolen by spyware or other "malware" that is installed surreptitiously on a user's computer.

Another popular challenge/response mechanism—which is often used as a backup in case a user forgets his or her password—is a secret question (e.g., "What is your mother's maiden name?", "What was your first telephone number?", etc.) to which the user provides an answer, a priori. Subsequently, at authentication time, the user is presented with the secret question and must respond with the previously-supplied answer. The efficacy and security of this mechanism relies on using a secret question whose answer is easily remembered by the user, but is unlikely to be known by an imposter. This technique, unfortunately, also suffers from a number of disadvantages: first, the answer to a secret question is typically much easier to guess than a good password; second, it is possible that the information requested is publicly obtainable; and third, security administrators all seem to use the same "classic" secret questions, so that a question compromised on one system likely compromises other systems as well.

Therefore, what is needed is a secure authentication technique that overcomes some of the disadvantages of the prior art.

SUMMARY OF THE INVENTION

The present invention is a secure method of authenticating users without some of the disadvantages of the prior art. In particular, the illustrative embodiments maintain a geo-location history of a wireless device (e.g., a Global Positioning System [GPS]-enabled wireless telecommunications terminal, a smart card, a radio frequency identification [RFID] tag, etc.), and the user is authenticated by asking one or more questions based on the geo-location history, such as:

Where were you Tuesday at 14:45?
When were you last at the Starbucks on the corner of Main and First?
Which of the following people did you meet with this afternoon at three o'clock: John Smith, Mary Jones, Don Cooper, Sue Johnson, and Ted Newman?
In what compass direction did you head this morning?
What time did you leave your house this morning?
This morning, did you take back roads or I-78?
What was your maximum speed during your commute this morning?
What was your average speed during your last trip from Basking Ridge to Holmdel?
On the map below, click on places that you drove last Wednesday.
What was the weather when you were last here?
How fast were you driving then?
Where did you spend your summer vacation?

In the first illustrative embodiment, a user of a geo-location-enabled wireless telecommunications terminal (e.g., a GPS-enabled cell phone, a GPS-enabled notebook computer, etc.) who attempts to access a restricted resource is challenged with one or more questions that are generated from the terminal's geo-location history. In the second illustrative embodiment, a user of a data-processing system who attempts to access a restricted resource is asked to provide a username Z. The user is then challenged with one or more questions that are generated from the geo-location history of a wireless device that is associated with username Z (e.g., a cell phone that belongs to the user whose username is Z, an on-board navigation system of a car that belongs to the user whose username is Z, etc.).

The illustrative embodiment comprises: receiving a response to an authentication challenge, wherein the response is provided by a user, and wherein the authentication challenge comprises a question about the user's geo-location history; and determining whether the user is successfully authenticated based on how consistent the response is with the geo-location history of a wireless device.

BRIEF DESCRIPTION OF THE DRAWINGS

FIG. 3 depicts an illustrative schema and illustrative entries for table 201, as shown in FIG. 2, in accordance with the first illustrative embodiment of the present invention.

FIG. 4 depicts an illustrative schema and illustrative entries for table 202, as shown in FIG. 2, in accordance with the first illustrative embodiment of the present invention.

FIG. 5 depicts an illustrative schema and illustrative entries for table 203, as shown in FIG. 2, in accordance with the first illustrative embodiment of the present invention.

DETAILED DESCRIPTION

Figure 1:
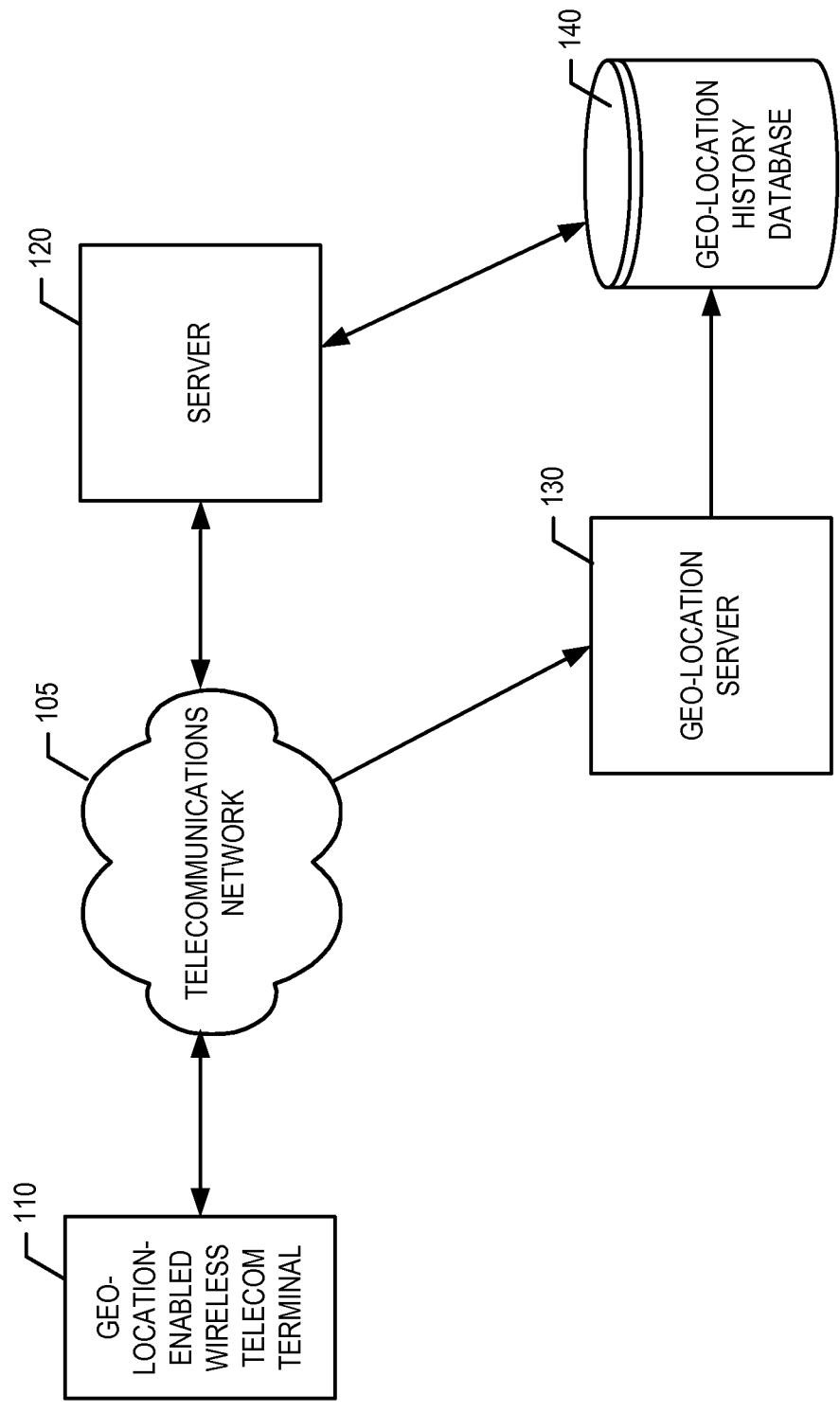
FIG. 1 depicts the salient elements of the first illustrative embodiment of the present invention.

FIG. 1 depicts the salient elements of the first illustrative embodiment of the present invention. As shown in FIG. 1, the first illustrative embodiment comprises telecommunications network 105, geo-location-enabled wireless telecommunications terminal 110, server 120, geo-location server 130, and geo-location database 140, interconnected as shown.

Telecommunications network 105 is a network that comprises one or more wireless elements (e.g., wireless access points, wireless base stations, etc.) and is capable of transporting signals to and from wireless telecommunications terminals, such as terminal 110, and data-processing systems, such as server 120 and geo-location server 130. As will be appreciated by those skilled in the art, after reading this disclosure, although in the illustrative embodiments telecommunications network 105 is depicted as a single network, in some other embodiments of the present invention telecommunications network 105 might actually comprise two or more networks.

Figure 6:
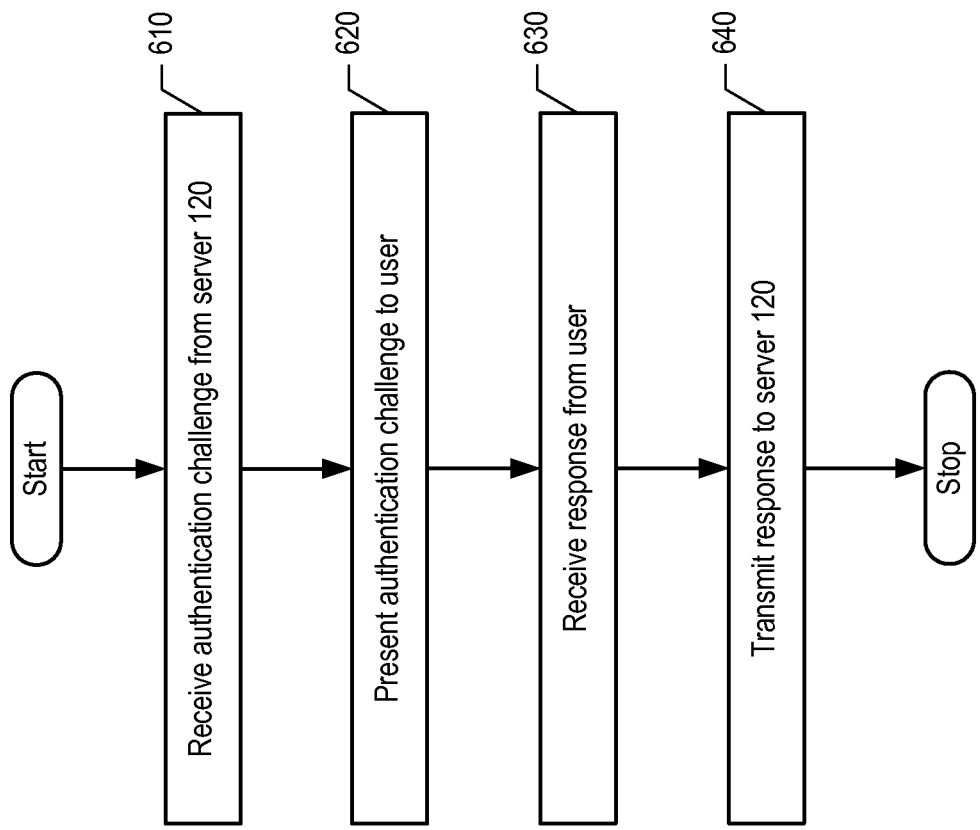
FIG. 6 depicts a flowchart of the salient tasks of wireless telecommunications terminal 110, as shown in FIG. 1, in accordance with the first illustrative embodiment of the present invention.

Geo-location-enabled wireless telecommunications terminal 110 is a device that is capable of:
- wirelessly transmitting and receiving electromagnetic signals to and from telecommunications network 105;
- receiving user inputs (e.g., keystrokes, voice commands, etc.);
- wirelessly receiving one or more electromagnetic signals and estimating terminal 110's geo-location based on these signals;
- hosting one or more resources (e.g., files, applications, etc.) that require a user to be authenticated before access is granted; and
- performing the tasks described below and with respect to FIG. 6.

As will be appreciated by those skilled in the art, there are a variety of well-known methods for estimating geo-location based on received electromagnetic signals (e.g., via a Global Positioning System (GPS) receiver, via triangulation, via RF fingerprinting, etc.), and it will be clear to those skilled in the art, after reading this disclosure, how to make and use embodiments of the present invention for terminals that use these methods—as well as embodiments in which the estimation of terminal 110's geo-location is performed by an entity other than wireless telecommunications terminal 110. As will further be appreciated by those skilled in the art, hands-free wireless telecommunications terminal 110 might communicate via one or more protocols (e.g., Code Division Multiple Access [CDMA], Institute of Electrical and Electronics Engineers [IEEE] 802.11, Bluetooth, etc.), and it will be clear to those skilled in the art, after reading this disclosure, how to make and use embodiments of the present invention based on these protocols.

Server 120 is a data-processing system that is capable of receiving and transmitting signals via telecommunications network 105, of hosting one or more resources (e.g., files, applications, etc.) that require a user to be authenticated before access is granted, and of performing the tasks described below and with respect to FIGS. 7 and 8. As will be appreciated by those skilled in the art, some other embodiments of the present invention might divide the functions of server 120 among two or more servers (e.g., an application server and an authentication server, etc.), and it will be clear to those skilled in the art, after reading this disclosure, how to make and use such embodiments.

For easier digestion, a description of geo-location server 130 is deferred until after that of geo-location history database 140 and FIGS. 2 through 6, below.

Geo-location history database 140 is a database that is capable of storing and organizing data in a manner that enables efficient access and queries. For illustrative purposes, geo-location database 140 is a relational database; however, it will be clear to those skilled in the art, after reading this disclosure, how to make use other embodiments of the present invention in which geo-location database 140 is some other kind of database (e.g., an object-oriented database, a hierarchical database, etc.).

Figure 2:
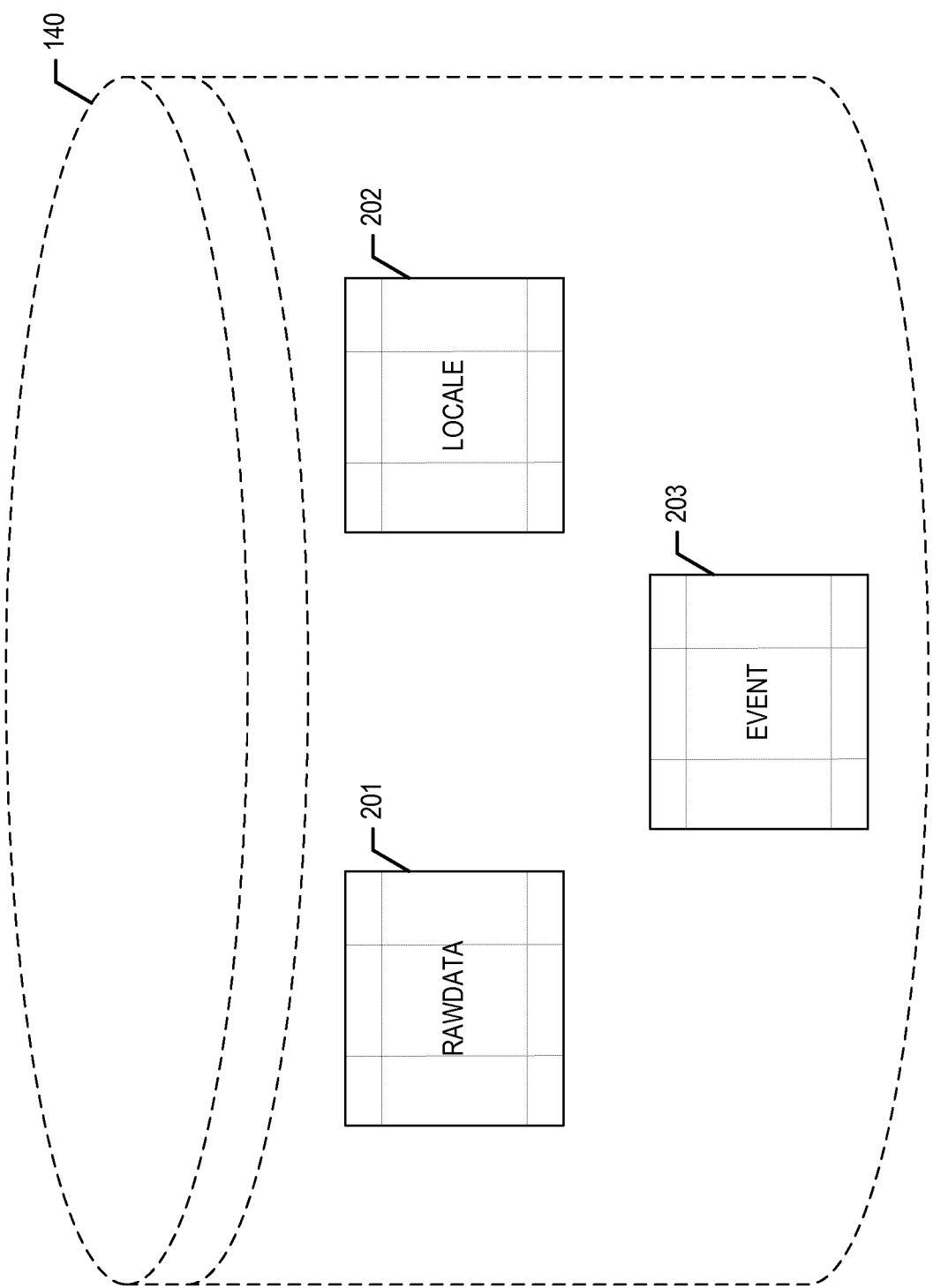
FIG. 2 depicts the salient information stored in geo-location history database 140, as shown in FIG. 1, in accordance with the first illustrative embodiment of the present invention.

As shown in FIG. 2, geo-location history database 140 comprises three illustrative tables 201 through 203, each of which is described below and with respect to FIGS. 3 through 5, respectively. The names of the tables are "RawData," "Locale," and "Event."

FIG. 3 depicts an illustrative schema and illustrative entries for table 201, in accordance with the first illustrative embodiment of the present invention. Table 201 comprises four columns: the first column is an identifier for a particular wireless telecommunications terminal (e.g., a telephone number, an Internet Protocol address, etc.); the second column is a time; and the third and fourth columns are the latitude and longitude of a geo-location. Each row of table 201 thus indicates the geo-location of a wireless telecommunications terminal at a particular time.

FIG. 4 depicts an illustrative schema and illustrative entries for table 202, in accordance with the first illustrative embodiment of the present invention. Table 202 comprises five columns: the first column is an identifier for a particular locale; the second column is a name for the locale; the third column is a wireless telecommunications terminal identifier, as in tables 201 and 1004; and the fourth and fifth columns are the latitude and longitude of a geo-location. Each row of table 203 thus defines the geo-location of a particular locale, where the name of a locale might be associated with a particular terminal identifier (e.g., the home or office of a user who owns a particular wireless telecommunications terminal, etc.), or might not be associated with any particular terminal (for example, as in the third row representing Yankee Stadium, where the terminal ID is null.) Note that it is possible that a particular physical entity might be represented by two or more locales in table 202. For example, the latitude and longitude of the second and third rows are identical, indicating that the user who owns the cell phone with telephone number 555-123-4567 happens to work at Yankee Stadium. By doing so, the wireless telecommunications terminal of a user who does not work at Yankee Stadium might receive an authentication challenge that asks "When were you last at Yankee Stadium?", while the wireless telecommunications terminal of a user who does work at Yankee Stadium might receive an authentication challenge that asks "What time did you get into work yesterday?".

FIG. 5 depicts an illustrative schema and illustrative entries for table 203, in accordance with the first illustrative embodiment of the present invention. Table 203 comprises nine columns: the first column is an identifier for an "event"; the second column is a terminal identifier; the third and fourth columns are a starting time and locale for the event; the fifth and sixth columns are an ending time and locale for the event; the seventh column is a route taken by the wireless telecommunications terminal during the event; and the eighth and ninth columns are the average and maximum speeds of the wireless telecommunications terminal during the event. For example, the first row in FIG. 6 represents the "event" in which the owner of the wireless telecommunications terminal with telephone number "555-123-4567" was at home. (The maximum speed was technically greater than zero but was rounded to the nearest integer.) As another example, the second row in FIG. 6 represents the event in which this user commuted to work, taking the Garden State Parkway in the northbound direction.

As will be appreciated by those skilled in the art, in some embodiments of the present invention the schema of table 203 might be augmented with additional information—for example, minimum speed—which might indicate whether there was a traffic jam during a user's commute on a highway and enable challenge questions such as "Were you in a traffic jam yesterday?", "Did you see an accident?", and so forth.

Now returning to FIG. 1, geo-location server 130 is a data-processing system that is capable of:

(i) receiving a geo-location and a terminal identifier of a wireless telecommunications terminal (e.g., wireless telecommunications terminal 110, etc.) at one or more points in time;

(ii) transmitting commands to geo-location history database 140 to add each geo-location/identifier pair, along with a timestamp, to RawData table 201; and (iii) executing a background thread that periodically reviews the contents of RawData table 201 and, in conjunction with Locale table 202, extracts meaningful, summarized events and stores these events in Event table 203.

As will be appreciated by those skilled in the art, there are a variety of ways in which the aforementioned thread of geo-location server 130 can carry out task (iii). For example, the event represented by the first row of table 203 in FIG. 5 might be derived from a series of chronologically-ordered entries in table 201 for terminal identifier 555-123-4567, where each entry has a geo-location that is substantially the same as locale LX24397R (i.e., the home of the user whose cell phone number is 555-123-4567). The term "substantially the same" is intended to account for inconsequentially small geo-location differences (e.g., two different rooms in a house, etc.).

FIG. 6 depicts a flowchart of the salient tasks of wireless telecommunications terminal 110, in accordance with the first illustrative embodiment of the present invention. (Not depicted in FIG. 6 is terminal 110's periodic reporting of its geo-location to geo-location server 130, as described above.) It will be clear to those skilled in the art which tasks depicted in FIG. 6 can be performed simultaneously or in a different order than that depicted.

At task 610, wireless telecommunications terminal 110 receives an authentication challenge from server 120, in response to either (i) the user of terminal 110 attempting to access a restricted resource of server 120, or (ii) an authentication request sent to server 120 by terminal 110 after the user of terminal 110 attempts to access a restricted resource of terminal 110.

At task 620, wireless telecommunications terminal 110 presents the authentication challenge to its user (e.g., via its video display, speaker, etc.), in well-known fashion.

At task 630, wireless telecommunications terminal 110 receives its user's response, in well-known fashion.

At task 640, wireless telecommunications terminal 110 transmits the response to server 120, in well-known fashion.

Figure 7:
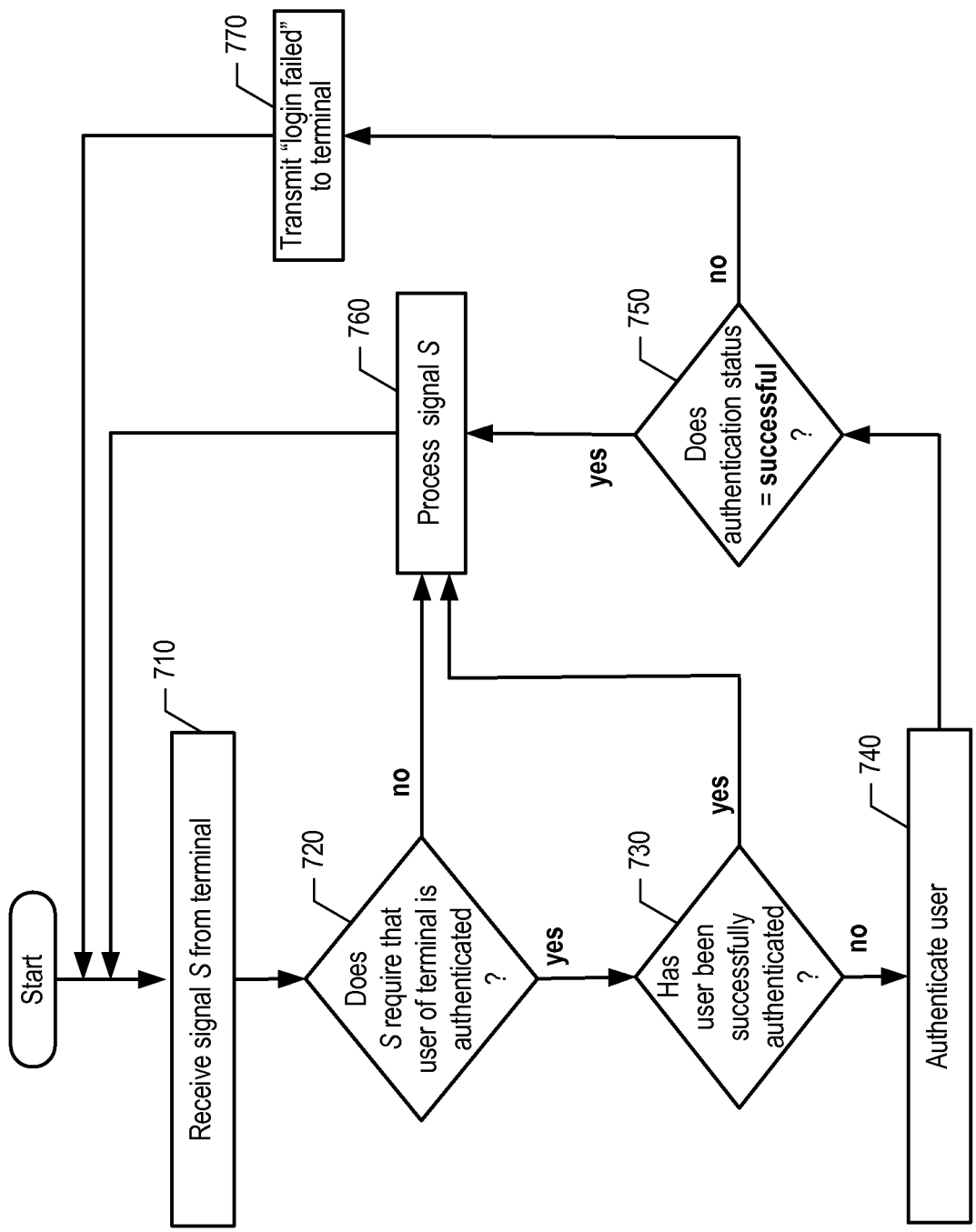
FIG. 7 depicts a flowchart of the salient tasks of server 120, as shown in FIG. 1, in accordance with the first illustrative embodiment of the present invention.

FIG. 7 depicts a flowchart of the salient tasks of server 120, in accordance with the first illustrative embodiment of the present invention. It will be clear to those skilled in the art which tasks depicted in FIG. 7 can be performed simultaneously or in a different order than that depicted.

At task 710, server 120 receives a signal S from a wireless telecommunications terminal, in well-known fashion. (In order to simplify the description of the remaining tasks of FIG. 7, as well as the subtasks of FIG. 8, it is assumed for convenience that signal S is received from wireless telecommunications terminal 110.)

At task 720, server 120 checks whether signal S requires that the user of wireless terminal 110 has been authenticated. If so, execution proceeds to task 730, otherwise execution continues at task 750. (As described above, in some embodiments only a subset of signals received from terminal 110 might require the user to be authenticated, while in some other embodiments authentication might be required for any signal received from terminal 110.)

At task 730, server 120 checks whether the user of wireless terminal 110 has been successfully authenticated. If so, execution continues at task 750, otherwise execution proceeds to task 740.

At task 740, server 120 authenticates the user, as described below and with respect to FIG. 8.

At task 750, server 120 branches to either task 760 or task 770, depending on whether or not the authentication at task 740 was successful.

At task 760, server 120 processes signal S in accordance with how it is programmed, in well-known fashion. After task 760, execution continues back at task 710.

At task 770, server 120 transmits a message to wireless telecommunications terminal 110 indicating that authentication failed. After task 770, execution continues back at task 710.

Although the method of FIG. 7 does not depict any mechanism for limiting the number of consecutive failed login attempts, this technique is well-known in the art and it will be clear to those skilled in the art, after reading this disclosure, how to make and use embodiments of the present invention that incorporate this technique. Similarly, although the method of FIG. 7 presents a single authentication challenge, it will be clear to those skilled in the art, after reading this disclosure, how to make and use embodiments of the present invention in which the method of FIG. 7 is modified to challenge a terminal's user with a plurality of questions that must be answered correctly.

Figure 8:
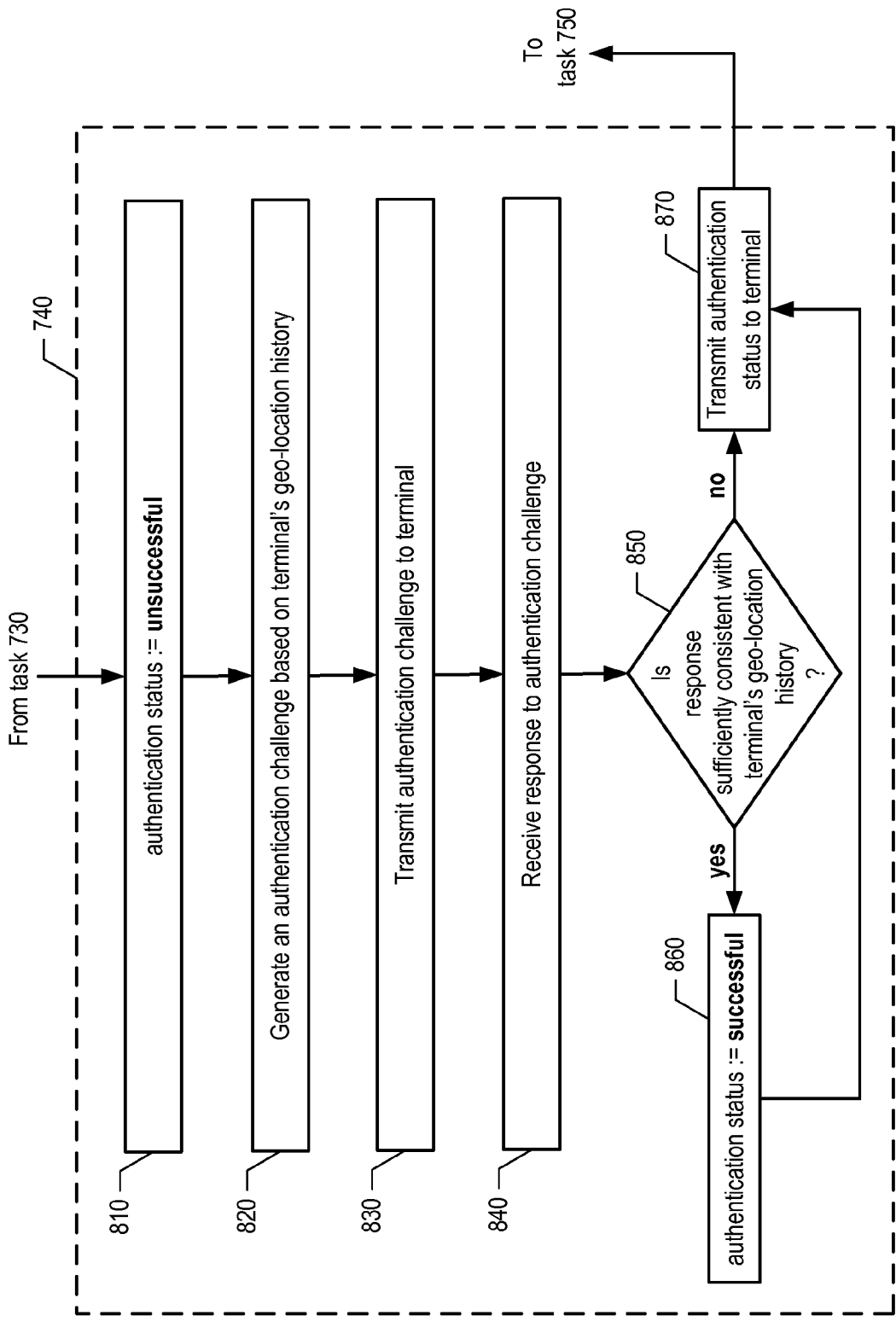
FIG. 8 depicts a detailed flowchart for task 740, as shown in FIG. 7, in accordance with the first illustrative embodiment of the present invention.

FIG. 8 depicts a detailed flowchart for task 740, in accordance with the illustrative embodiment of the present invention. It will be clear to those skilled in the art which subtasks depicted in FIG. 6 can be performed simultaneously or in a different order than that depicted.

At subtask 810, server 120 sets an authentication status flag for terminal 110's user to unsuccessful.

At subtask 820, server 120 generates an authentication challenge based on terminal 110's geo-location history. As will be appreciated by those skilled in the art, there are a variety of methods that could be used to generate questions from geo-location history database 140. For example, a challenge might be generated by selecting one of the events for terminal 110 from table 203, describing the event using a portion of the information for that event (preferably using meaningful descriptions such as the locale name rather than the locale identifier), and prompting the user to supply one or more missing data about the event. As will further be appreciated by those skilled in the art, challenges that incorporate more complex concepts, such as "When was the last time you were at Yankee Stadium?", might be generated by instantiating "prepared statement" queries that have been composed a priori.

At subtask 830, server 120 transmits the authentication challenge to telecommunications terminal 110, in well-known fashion.

At subtask 840, server 120 receives a response to the authentication challenge from telecommunications terminal 110, in well-known fashion.

At subtask 850, server 120 determines whether the response is sufficiently consistent with terminal 110's geo-location history (e.g., how close a particular time specified by the user is to a time obtained from the geo-location history, etc.) As will be appreciated by those skilled in the art, the particular bounds or other criteria that are employed in this determination is largely a policy issue to be decided by an administrator, programmer, etc., and it will be clear to those of ordinary skill in the art, after reading this disclosure, how to implement this determination in accordance with such policies.

If the response is determined to be sufficiently consistent with terminal 110's geo-location history at subtask 850, execution proceeds to subtask 860, otherwise execution continues at subtask 870.

At subtask 860, server 120 sets the authentication status flag for terminal 110's user to successful.

At subtask 870, server 120 transmits the value of the authentication status flag to wireless telecommunications terminal 110, in well-known fashion. After subtask 870, execution continues at task 750 of FIG. 7.

Figure 9:
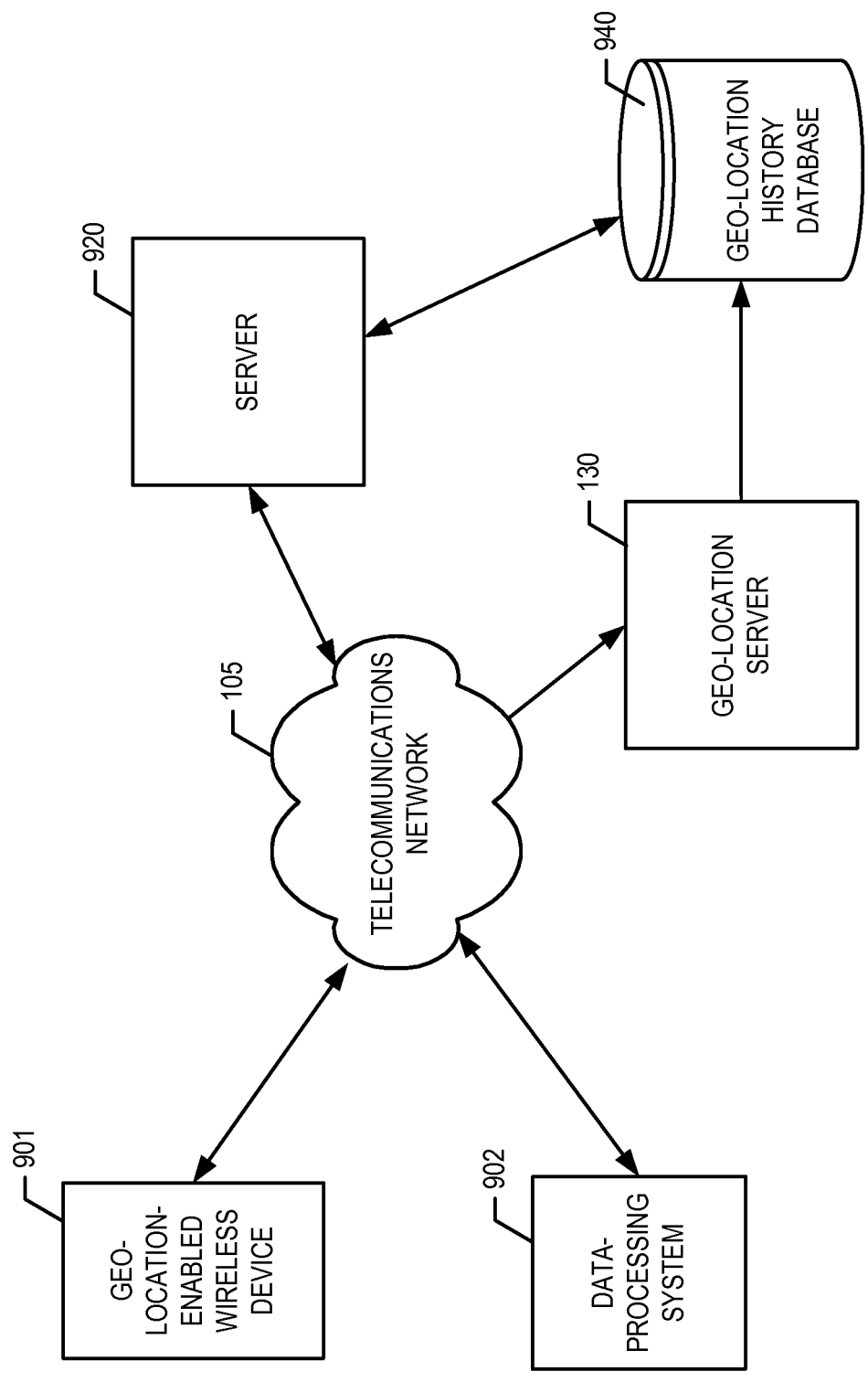
FIG. 9 depicts the salient elements of the second illustrative embodiment of the present invention.

FIG. 9 depicts the salient elements of the second illustrative embodiment of the present invention. The second illustrative embodiment differs from the first illustrative embodiment in that a user uses an arbitrary data-processing system to access a restricted resource—rather than using his or her wireless telecommunications terminal, which collected the geo-location history data. In this second illustrative embodiment, the geo-location history of a user is generated from the geo-locations reported by a geo-location-enabled wireless device carried by the user (e.g., a Global Positioning System [GPS] navigational device, a cell phone or other wireless telecommunications terminal, a smart card, a radio frequency identification [RFID] tag, etc.) When the user attempts to access a restricted resource using a different data-processing system (e.g., a personal computer, another telecommunications terminal, etc.), the user is asked to provide a username, and then receives a question about the geo-location history of the user associated with the specified username.

As shown in FIG. 9, the second illustrative embodiment comprises telecommunications network 105, geo-location-enabled wireless device 901, data-processing system 902, server 920, geo-location server 130, and geo-location database 940, interconnected as shown.

Geo-location-enabled wireless device 901 is capable of:
(i) wirelessly receiving one or more electromagnetic signals and estimating device 901's geo-location based on these signals; or
(ii) transmitting a signal to another entity that enables that entity to estimate device 901's geo-location; or
(iii) both (i) and (ii).

Figure 10:
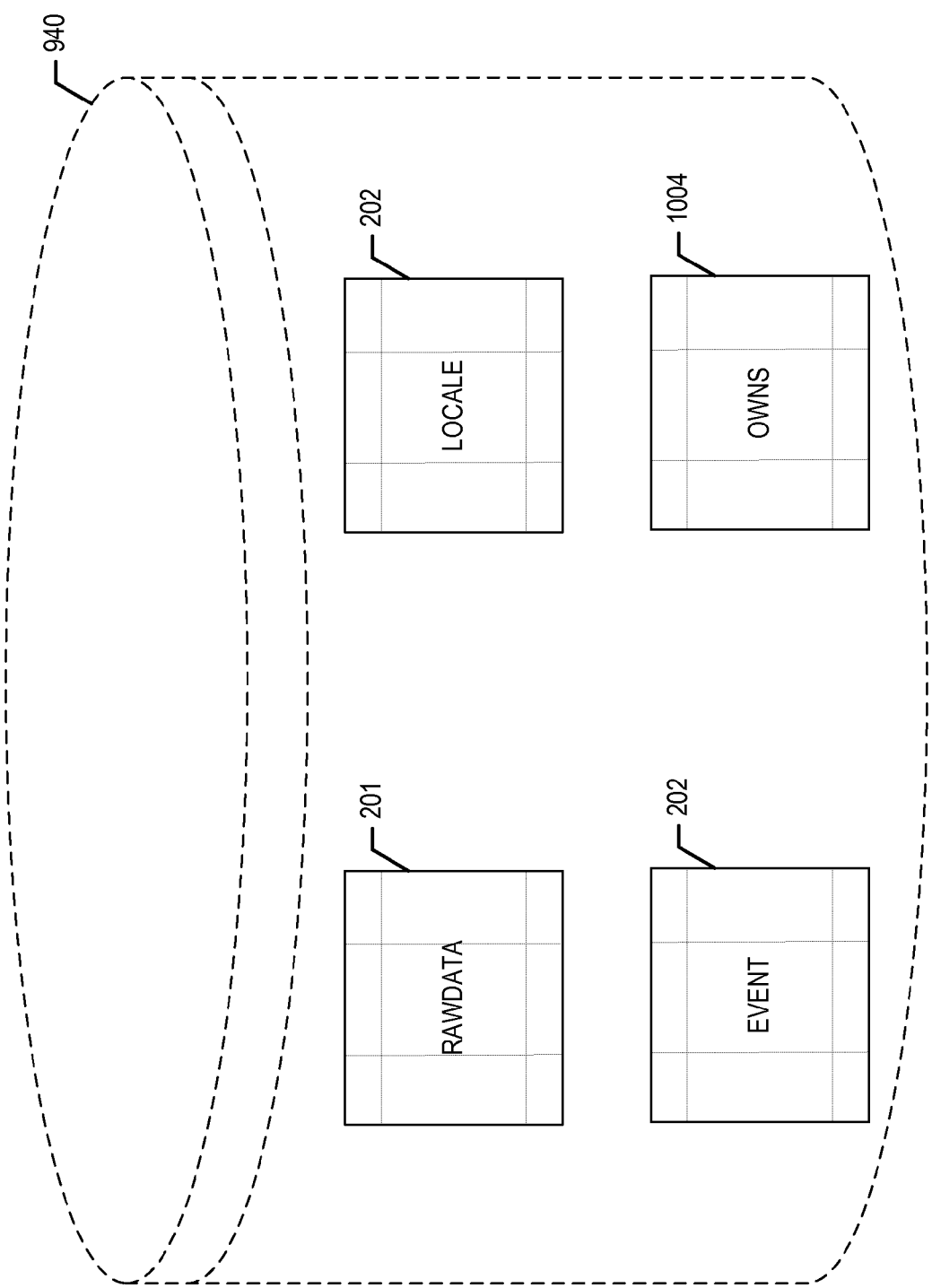
FIG. 10 depicts the salient information stored in geo-location history database 140, in accordance with the second illustrative embodiment of the present invention.
Figure 11:
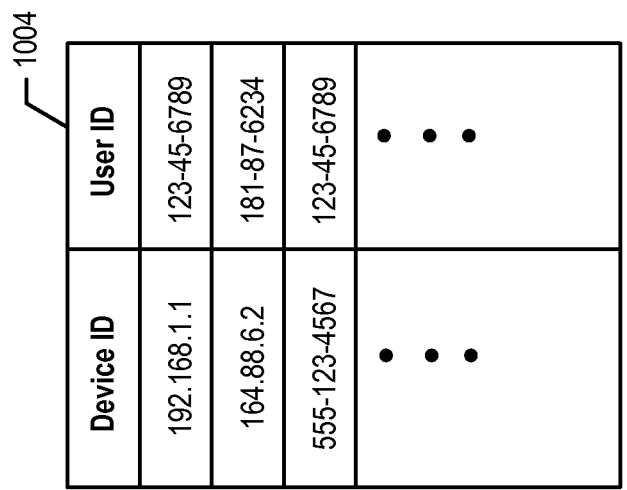
FIG. 11 depicts an illustrative schema and illustrative entries for table 1004, as shown in FIG. 10, in accordance with the second illustrative embodiment of the present invention.

Server 920 is a data-processing system that is capable of receiving and transmitting signals via telecommunications network 105, of hosting one or more resources (e.g., files, applications, etc.) that require a user to be authenticated before access is granted, and of authenticating a user as in the first illustrative embodiment, with the following exceptions:
 the user is first asked to provide a username; and
 server 920 then generates a challenge question based on the geo-location history for that username, which can be obtained from geo-location history database 940, described below and with respect to FIGS. 10 and 11.

As shown in FIG. 10, geo-location history database 940 is the same as geo-location history database 140, augmented with an additional table 1004 named "Owns," described below and with respect to FIG. 11.

FIG. 11 depicts an illustrative schema and illustrative entries for table 1004, in accordance with the second illustrative embodiment of the present invention. Table 1004 comprises two columns: the first column is a wireless device identifier (e.g., an Internet Protocol [IP] address, a telephone number, etc.), and the second column is a user identifier (e.g., a social security number, an account number, etc.). Each row of table 1004 thus indicates which wireless device is owned by—and presumably, carried by—which user, thereby enabling the geo-location history of a user to be inferred from the geo-location history of one or more of the user's wireless devices. Note that in FIG. 11 the user identified by "123-45-6789" is associated with two devices (e.g., a smart card and a pager, etc.), one of which has an IP address and one of which has a telephone number.

Although the second illustrative embodiment is disclosed in the context of restricting access to a data-processing system (902), it will be clear to those skilled in the art, after reading this disclosure, how to make and use embodiments of the present invention for restricting access to other types of systems (e.g., automobiles, safes, home-security systems, etc.) that are not typically thought of as "data-processing systems."

Furthermore, it will be appreciated by those skilled in the art, after reading this disclosure, that some embodiments of the present invention might incorporate additional geo-location-based data, such as traffic data and news reports, and it will be clear to those skilled in the art, after reading this disclosure, how to make and use embodiments that incorporate such data and that generate authentication challenges based, at least in part, on such data.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
 determining a first geo-location history of a wireless device based on a signal received from the wireless device, the signal indicating a device identifier associated with the wireless device and a first geo-location associated with the device identifier, the first geo-location corresponding to a previous point in time;

sending an authentication challenge to the wireless device, the authentication challenge comprising a question about a second geo-location history of a user of the wireless device;

receiving a response to the authentication challenge, wherein the response is provided by the user and specifies a second geo-location; and determining whether the user is successfully authenticated based on a comparison of the first geo-location history of the wireless device with the second geo-location history of the user, wherein determining whether the user is successfully authenticated is further based on a distance between the first geo-location and the second geo-location.

2. The method of claim 1, wherein determining the first geo-location history comprises inferring a characteristic of a previous location and time associated with the wireless device, the characteristic being inferred based on one of a first previous location, a second previous location, a first previous time associated with the first previous location, and a second previous location associated with the second previous location.

3. The method of claim 1, wherein the response specifies a first time, and wherein determining whether the user is successfully authenticated is further based on a difference between the first time and the previous point in time corresponding to the first geo-location.

4. The method of claim 1, wherein the response specifies a first direction, and wherein the determination whether the user is successfully authenticated is further based on a difference between the first direction and a second direction that is obtained from the first geo-location history.

5. The method of claim 1, wherein the authentication challenge inquires about a route taken during a prior time interval.

6. The method of claim 1, wherein the authentication challenge inquires about one or both of a maximum speed and an average speed during a prior time interval.

7. A non-transitory computer-readable storage device having stored therein instructions which, when executed by a processor, cause the processor to perform operations comprising:

determining a first geo-location history of a wireless device based on a signal received from the wireless device, the signal indicating a device identifier associated with the wireless device and a first geo-location associated with the wireless device, the first geo-location corresponding to a previous point in time;

sending an authentication challenge to the wireless device, the authentication challenge comprising a question about a second geo-location history of a user of the wireless device;

receiving a response to the authentication challenge, wherein the response is provided by the user and specifies a second geo-location; and determining whether the user is successfully authenticated based on a comparison of the first geo-location history of the wireless device with the second geo-location history of the user, wherein determining whether the user is successfully authenticated is further based on a distance between the first geo-location and the second geo-location.

8. The computer-readable storage device of claim 7, wherein determining the first geo-location history comprises inferring a characteristic of a previous location and time associated with the wireless device, the characteristic being inferred based on one of a first previous location, a second previous location, a first previous time associated with the first previous location, and a second previous location associated with the second previous location.

9. The computer-readable storage device of claim 7, wherein the response specifies a first direction, and wherein determining whether the user is successfully authenticated is further based on a difference between the first direction and a second direction that is obtained from the first geo-location history.

10. The computer-readable storage device of claim 7, wherein the response specifies a first speed, and wherein determining whether the user is successfully authenticated is further based on a difference between the first speed and a second speed that is obtained from the first geo-location history.

11. A system comprising:

a computer that performs operations comprising:

determining a first geo-location history of a wireless device based on a signal received from the wireless device, the signal indicating a device identifier associated with the wireless device and a first geo-location associated with the device identifier, the first geo-location corresponding to a previous point in time;

transmitting to the wireless device an authentication challenge requesting information about a second geo-location history associated with a user of the wireless device;

receiving an answer to the authentication challenge, wherein the answer specifies a second geo-location;

sending the answer to a separate device as part of a request for authentication; and receiving a response to the request for authentication from the separate device, the response being based on a comparison of the first geo-location history of the wireless device with the second geo-location history of the user, and being based on a distance between the first geo-location and the second geo-location.

12. The system of claim 11, wherein the authentication challenge asks for a time at which the user of the wireless device was present at a particular geo-location.

13. The system of claim 11, wherein the authentication challenge asks for a geo-location at which the user of the wireless device was present at a particular time.

14. The system of claim 11, wherein the authentication challenge asks whether a particular geo-location was visited during a particular time interval.

15. The system of claim 11, wherein the authentication challenge inquires about a most recent time that a particular geo-location was visited.

* * * * *